(12) United States Patent
Zhang et al.

(10) Patent No.: US 10,171,020 B2
(45) Date of Patent: Jan. 1, 2019

(54) INTELLIGENT COOPERATIVE CONTROL SYSTEM AND METHOD FOR MULTI-UNIT PERMANENT MAGNET SYNCHRONOUS MOTOR

(71) Applicant: Northeastern University, Shenyang, Liaoning Province (CN)

(72) Inventors: Huaguang Zhang, Shenyang (CN); Shijie Yan, Shenyang (CN); Bingyi Zhang, Shenyang (CN); Weihang Yan, Shenyang (CN); Xu Wang, Shenyang (CN); Xiuchong Liu, Shenyang (CN); Enhui Chu, Shenyang (CN); Xiaomin Xu, Shenyang (CN)

(73) Assignee: NORTHEASTERN UNIVERSITY, Shenyang, Liaoning Province (CN)

( * ) Notice: Subject to any disclaimer, the term of this patent is extended or adjusted under 35 U.S.C. 154(b) by 0 days.

(21) Appl. No.: 15/528,751

(22) PCT Filed: Aug. 14, 2015

(86) PCT No.: PCT/CN2015/086955
§ 371 (c)(1),
(2) Date: May 22, 2017

(87) PCT Pub. No.: WO2017/024596
PCT Pub. Date: Feb. 16, 2017

(65) Prior Publication Data
US 2017/0324361 A1    Nov. 9, 2017

(30) Foreign Application Priority Data

Aug. 7, 2015 (CN) .......................... 2015 1 0478313

(51) Int. Cl.
*H02M 7/48* (2007.01)
*H02P 21/24* (2016.01)
(Continued)

(52) U.S. Cl.
CPC ............... *H02P 21/24* (2016.02); *H02K 1/00* (2013.01); *H02K 3/28* (2013.01); *H02K 11/33* (2016.01);
(Continued)

(58) Field of Classification Search
CPC .......... H02M 7/48; H02M 7/217; H02M 7/23; H02M 7/18
(Continued)

(56) References Cited

U.S. PATENT DOCUMENTS 4,849,780 A * 7/1989 Amano .................. G03B 17/18
 396/297
5,130,617 A * 7/1992 Oshima ..................... B66B 1/28
 318/255

(Continued)

FOREIGN PATENT DOCUMENTS

CN  101478258 A  7/2009
CN  103472312 A  5/2012

(Continued)

OTHER PUBLICATIONS

Zhao, Pinzhi et al., "Multi-unit Motor Parallel Drive System for Electric Vehicle Application", 2008 IEEE Vehicle Power and Propulsion Conference, Sep. 5, 2008, 5 pages.

(Continued)

*Primary Examiner* — Rina Duda
(74) *Attorney, Agent, or Firm* — Muncy, Geissler, Olds & Lowe, P.C.

(57) ABSTRACT

An intelligent cooperative control system and method thereof. A parallel structure for low-voltage multi-module permanent magnet synchronous motor cooperative control units is adopted to realize control of low-voltage high power, control of low-speed large torque and system redundancy control; a double-parallel PWM rectifier circuit structure is (Continued)

used, when the system is in unbalanced power supply network environments; a resonant pole-type three-phase soft-switching inverter circuit is used as an inverter unit to improve utilization of DC bus voltage and to greatly reduce device switch losses at high frequencies; a current control and speed estimation unit is used, so that rotor speed and phase angle information is accurately estimated with low cost and high reliability; a controlled object is the multi-module permanent magnet synchronous motor, so that the problems of difficulties in motor installation, transportation and maintenance of a high-power electric drive system and the like are solved.

7 Claims, 17 Drawing Sheets

(51) Int. Cl.
| | | |
|---|---|---|
| *H02P 6/15* | (2016.01) | |
| *H02P 6/28* | (2016.01) | |
| *H02P 25/22* | (2006.01) | |
| *H02M 5/458* | (2006.01) | |
| *H02M 7/08* | (2006.01) | |
| *H02K 1/00* | (2006.01) | |
| *H02K 3/28* | (2006.01) | |
| *H02K 11/33* | (2016.01) | |
| *H02M 7/219* | (2006.01) | |
| *H02M 7/5387* | (2007.01) | |

(52) U.S. Cl.
CPC ........... *H02M 5/4585* (2013.01); *H02M 7/08* (2013.01); *H02P 6/15* (2016.02); *H02P 6/28* (2016.02); *H02P 25/22* (2013.01); *H02M 7/219* (2013.01); *H02M 2007/4815* (2013.01); *H02M 2007/53876* (2013.01)

(58) Field of Classification Search
USPC .......................... 318/400.02, 727, 801, 802
See application file for complete search history.

(56) References Cited

U.S. PATENT DOCUMENTS

| | | | | |
|---|---|---|---|---|
| 5,460,244 | A * | 10/1995 | Tanahashi ............... | H02M 1/36 187/293 |
| 7,327,588 | B2 * | 2/2008 | Ollila .................... | H02M 7/493 363/71 |
| 7,773,396 | B2 * | 8/2010 | Ollila ................ | H02M 7/53873 318/801 |
| 8,374,011 | B2 * | 2/2013 | Wirth ...................... | H02M 7/49 363/125 |
| 8,787,048 | B2 * | 7/2014 | Moreno-Castaneda ...................... H02M 7/23 363/67 |
| 2008/0067984 | A1 | 3/2008 | Anghel et al. | |

FOREIGN PATENT DOCUMENTS

| | | |
|---|---|---|
| CN | 202261126 U | 5/2012 |
| CN | 102969860 A | 3/2013 |

OTHER PUBLICATIONS

Nagaishi, M. et al., "Failure Characteristics of Motor System Using Distributed Inverter for PMSM", Power Electrics and Applications, 2009. EPE'09. 13$^{TH}$ European Conference on, Sep. 10, 2009, 9 pages.

* cited by examiner the first permanent magnet motor cooperative control unit, the second permanent magnet motor cooperative control unit and the third permanent magnet motor cooperative control unit cooperatively control three stator units of the multi-unit permanent magnet synchronous motor in a parallel connection manner.

INTELLIGENT COOPERATIVE CONTROL SYSTEM AND METHOD FOR MULTI-UNIT PERMANENT MAGNET SYNCHRONOUS MOTOR

BACKGROUND OF THE INVENTION

1. Field of the Invention

The present invention belongs to the technical field of power electronics and power drive, and particularly relates to an intelligent cooperative control system and method for a multi-unit permanent magnet synchronous motor.

2. The Prior Arts

High-power electric drive system occupies an important position in industrial production, and is widely applied in aspects of hoisting for large-scale mines, main propulsion for large ships, megawatt-class wind power generation, and the like. At present, conventional high-power electric drive systems have many problems, mainly including that: in the aspect of system structures, most high-power electric drive systems use a single branch structure, causing high voltage level, no system redundancy and low reliability. In the aspect of rectification, most system rectifier parts use an uncontrollable rectifier mode, causing low power factor and large reactive power drive loss which easily produce low frequency harmonics in an unbalanced power supply network environment, and therefore, it is difficult to achieve optimized control of reactive power. In the aspect of inversion, most system inversion parts use a hard switching mode, causing large switching loss, especially during switching frequency increase and power increase of power devices. In the aspect of motor control, mechanical sensors are most usually used to detect the positions of motor rotors, causing high system cost, low reliability and large maintenance workload. In the aspect of motor manufacturing, most stators of traditional permanent magnet motors are manufactured by a whole processing method, causing problems of difficulty in high-voltage motor manufacturing, transportation, installation and maintenance, high transducer cost, low reliability, and the like.

SUMMARY OF THE INVENTION

In view of shortcomings existing in the prior art, the present invention provides an intelligent cooperative control system and method for a multi-unit permanent magnet synchronous motor, so as to solve problems of hard switching circuit energy loss and reactive power loss in the high-power electric drive systems, to solve problems of multi-unit cooperative control and fault-tolerant control, to solve problems of difficulty in motor installation, transportation and maintenance, to achieve optimization of overall energy, and to achieve the purpose of improving the utilization efficiency of electric energy.

The intelligent cooperative control system for the multi-unit permanent magnet synchronous motor disclosed by the present invention includes a double-parallel PWM rectifier circuit, a first permanent magnet motor cooperative control unit, a second permanent magnet motor cooperative control unit, a third permanent magnet motor cooperative control unit and a multi-unit permanent magnet synchronous motor, wherein the first permanent magnet motor cooperative control unit, the second permanent magnet motor cooperative control unit and the third permanent magnet motor cooperative control unit cooperatively control three stator units of the multi-unit permanent magnet synchronous motor in a parallel connection manner.

The first permanent magnet motor cooperative control unit, the second permanent magnet motor cooperative control unit and the third permanent magnet motor cooperative control unit adopt the same structure, each of which includes a driving circuit, a control unit and an inverter unit, wherein the control units realize cooperative control of the multi-unit permanent magnet synchronous motor by mutual communications.

Each of the control units includes a distributed cooperative controller and a current control and speed estimation unit, wherein the current control and speed estimation unit is used for acquiring A phase, B phase and C phase current detection signals of each stator module at an input end of the motor, obtaining rotor speed estimation values according to the acquired A Phase, B phase, and C phase current detection signals and simultaneously sending the rotor speed estimation values to the distributed cooperative controller of each control unit, and is also used for receiving output values of the distributed cooperative controllers, obtaining a direct-axis voltage reference value and a quadrature-axis voltage reference value in a two-phase stationary reference frame according to the output values, then obtaining PWM signals by using space vector pulse-width modulation, and sending the obtained PWM signals to the inverter unit through the driving circuits; the distributed cooperative controller is used for describing a communication structure of the three control units by using a method for constructing an undirected graph, obtaining an overall communication association matrix of each of the control units according to the constructed undirected graph, constructing an error function according to the rotor speed estimation value, a set rotor speed reference value and the overall communication association matrix of the control units, setting a real number matrix and real number items, and obtaining an output value of each of the distributed cooperative controllers according to the constructed error function.

In the multi-unit permanent magnet synchronous motor, a stator is in a 27-slot 30-pole split structure, each unit is in a 9-slot 10-pole structure, and all stator units share a rotor; the rotor is in a permanent magnetic built-in tangential structure; a double fractional slot concentrated winding with a pitch of 1 is adopted for a winding of each unit motor, and internal windings of the unit motors are in a star connection manner.

The control method using the intelligent cooperative control system for the multi-unit permanent magnet synchronous motor includes the following steps:

step 1: the first permanent magnet motor cooperative control unit, the second permanent magnet motor cooperative control unit and the third permanent magnet motor cooperative control unit simultaneously acquire the A phase, B phase and C phase current detection signals at the input end of the motor;

step 2: the first permanent magnet motor cooperative control unit, the second permanent magnet motor cooperative control unit and the third permanent magnet motor cooperative control unit cooperatively control according to the acquired A phase, B phase and C phase current detection signals so as to obtain the PWM signals; and step 3: frequency and amplitude of output stator voltage are changed according to the PWM signals to achieve cooperative control of speed of the unit motors.

The cooperative control of step 2 includes the following steps:

step 2-1: obtaining the rotor speed estimation value according to the A phase, B phase and C phase current detection signals, and simultaneously sending the signals to each control unit to achieve mutual communications among the three control units;

step 2-2: describing the communication structure of the three control units by using a method for constructing the undirected graph;

step 2-3: obtaining the overall communication association matrix of the control units according to the constructed undirected graph, and constructing the error function according to the rotor speed estimation value, the rotor speed reference value set by users and the overall communication association matrix of the control units;

step 2-4: setting the real number matrix and the real number items, and obtaining the output values according to the constructed error function; and step 2-5: obtaining the direct-axis voltage reference value and the quadrature-axis voltage reference value in the two-phase stationary reference frame according to the output values, and then obtaining PWM signals by using space vector pulse-width modulation.

The step 2-1: obtaining the rotor speed estimation value according to the A phase, B phase and C phase current detection signals includes the following steps:

step 2-1-1: enabling the received current detection signals to be subjected to analog-to-digital conversion, and performing Clark transformation and Park transformation on the converted A phase, B phase and C phase current signals according to initial phase angle values of the rotor, to obtain direct-axis current and quadrature-axis current in the two-phase rotating reference frame;

step 2-1-2: enabling the quadrature-axis current to be subjected to band-pass filter to obtain a high frequency component of the quadrature-axis current, multiplying the high frequency component of the quadrature-axis current with a sinusoidal high-frequency signal to obtain a quadrature-axis current high frequency component of a separable phase angle error signal, and enabling the quadrature-axis current high frequency component to be subjected to low-pass filter to obtain a current signal only containing phase angle errors; and step 2-1-3: obtaining the rotor speed estimation value by using a PI control algorithm, and obtaining a rotor phase angle estimation value by integral calculation on the rotor speed estimation value.

The communication association matrix of the step 2-3 is a symmetric matrix in which the number of rows and the number of columns are both 3, and elements in the matrix are 0 or 1: when the control units can communicate with each other, the element value is 1, else the element valve is 0; the error function is: a result of multiplying differences between the rotor speed estimation value of one control unit and those of the other control units with a coefficient plus a new result of multiplying differences between the rotor speed estimation value of the control unit and the set rotor speed reference value with a coefficient, wherein for the result of multiplying differences between the rotor speed estimation value of one control unit and those of the other control units with the coefficient, the coefficient is an element in the communication association matrix.

The output values of the step 2-4 are calculated as follows: the error function is multiplied by the real number matrix and the real number items, and then summed with the set rotor speed reference value, wherein the real matrix is a real number vector of 1×2.

The step 2-5: obtaining the direct-axis voltage reference value and the quadrature-axis voltage reference value in the two-phase stationary reference frame according to the output values, includes the following steps:

step 2-5-1: taking the output values as a quadrature-axis current reference;

step 2-5-2: enabling the obtained direct-axis current and quadrature-axis current to be subjected to the low-pass filter to obtain fundamental direct-axis current and fundamental quadrature-axis current;

step 2-5-3: comparing the fundamental quadrature-axis current with the quadrature-axis current reference, to obtain a quadrature-axis current error value, and comparing the fundamental direct-axis current and the direct-axis current reference, to obtain a direct-axis current error value;

step 2-5-4: respectively calculating the quadrature-axis current error value and the direct-axis current error value by using a PI control algorithm, to obtain a quadrature-axis voltage reference value and a direct-axis voltage reference value, and summing up the direct-axis voltage reference value with a high-frequency voltage signal value to obtain a direct-axis voltage reference value containing the high-frequency signal; and step 2-5-5: performing anti-Park transformation on the quadrature-axis voltage reference value and the direct-axis voltage reference value containing the high-frequency signal according to the motor rotor phase angle estimation value, to obtain a direct-axis voltage reference value and a quadrature-axis voltage reference value in the two-phase stationary reference frame, and then obtaining the PWM signals by using the space vector pulse-width modulation.

Advantages

According to the intelligent cooperative control system for the multi-unit permanent magnet synchronous motor disclosed by the present invention, the parallel structure for the low-voltage multi-permanent magnet motor cooperative control unit is adopted to realize control of low-voltage high power, control of low-speed large-torque and system redundancy control; in the aspect of rectification, the double-parallel PWM rectifier circuit structure is used, when the system is in the unbalanced power supply network environment, the two groups of PWM rectifiers are used to respectively control positive sequence current and negative sequence current, and reactive power loss and harmonic loss are reduced through closed-loop control of the positive sequence current and negative sequence current; a resonant pole-type three-phase soft-switching inverter circuit is used as the inverter unit to improve the utilization of DC bus voltage, and to greatly reduce the device switching losses at high frequencies; in the aspect of control of the permanent magnet motor, a current control and speed estimation unit is used, so that the rotor speed and phase angle information can be accurately estimated with low cost and high reliability; and the controlled object is the multi-unit permanent magnet synchronous motor, so that problems of difficulties in motor installation, transportation and maintenance of the high-power electric drive system and the like are solved.

DETAILED DESCRIPTION OF THE PREFERRED EMBODIMENT

An embodiment of the present invention is further described in connection with the accompanying drawings.

Figure 1:
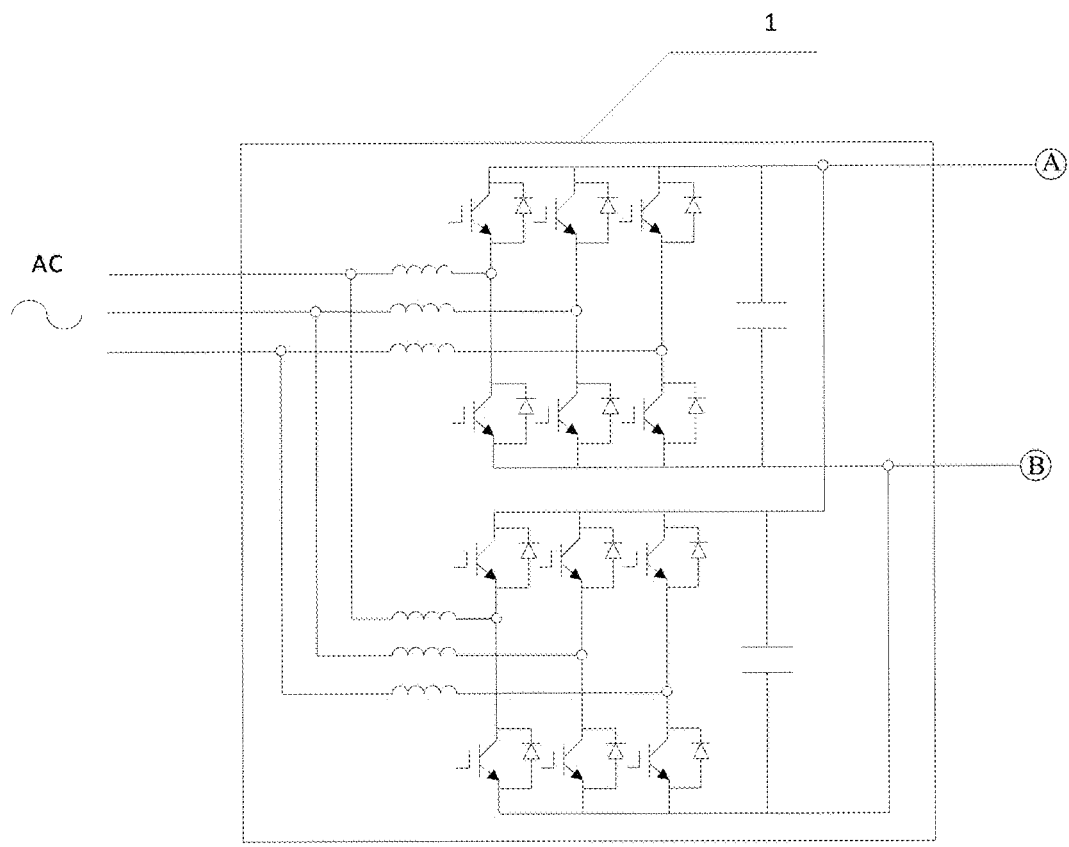
FIG. 1 is a block diagram of the structure of the intelligent cooperative control system for the multi-unit permanent magnet synchronous motor according to an embodiment of the present invention.
Figure 1:
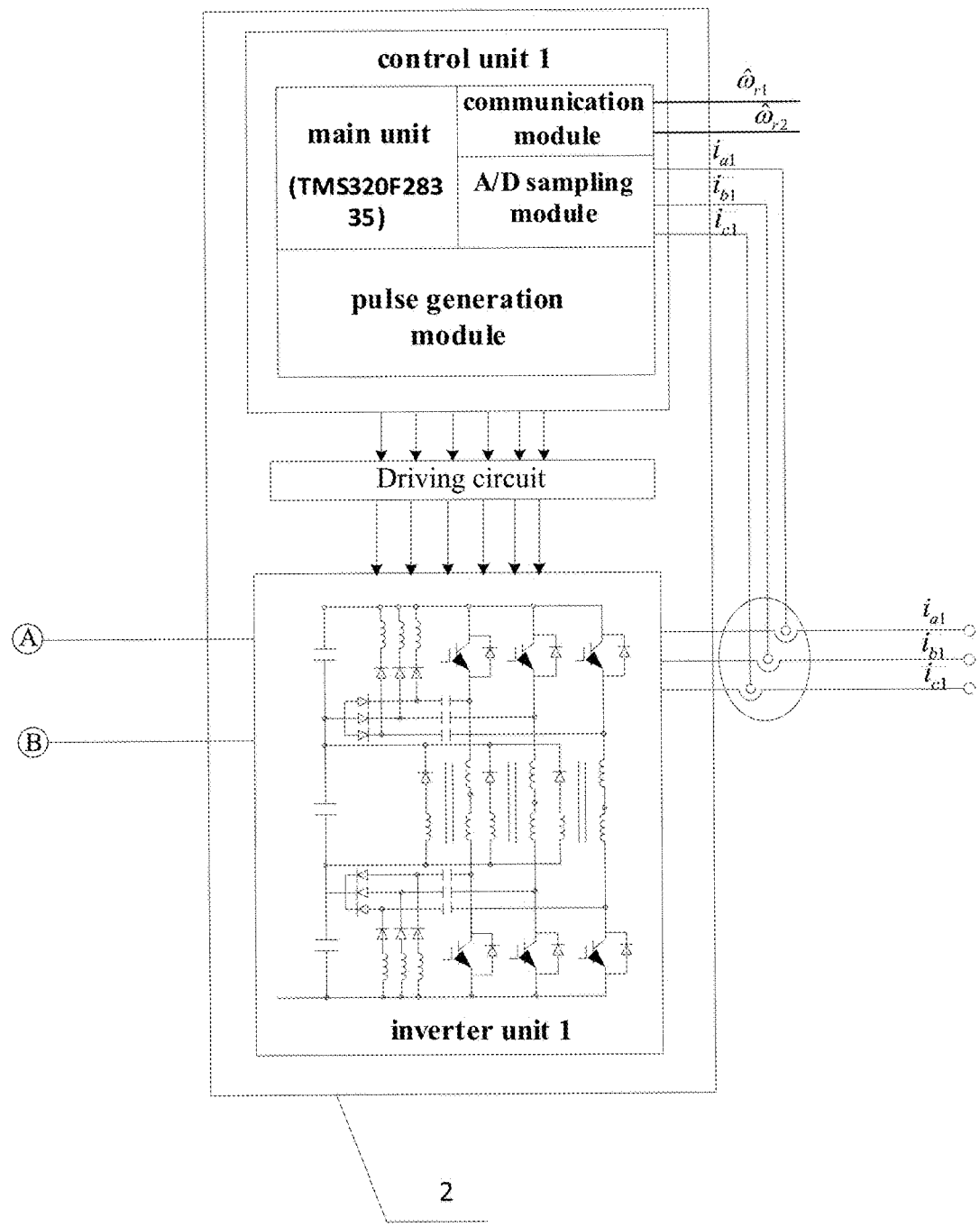
Figure 1:
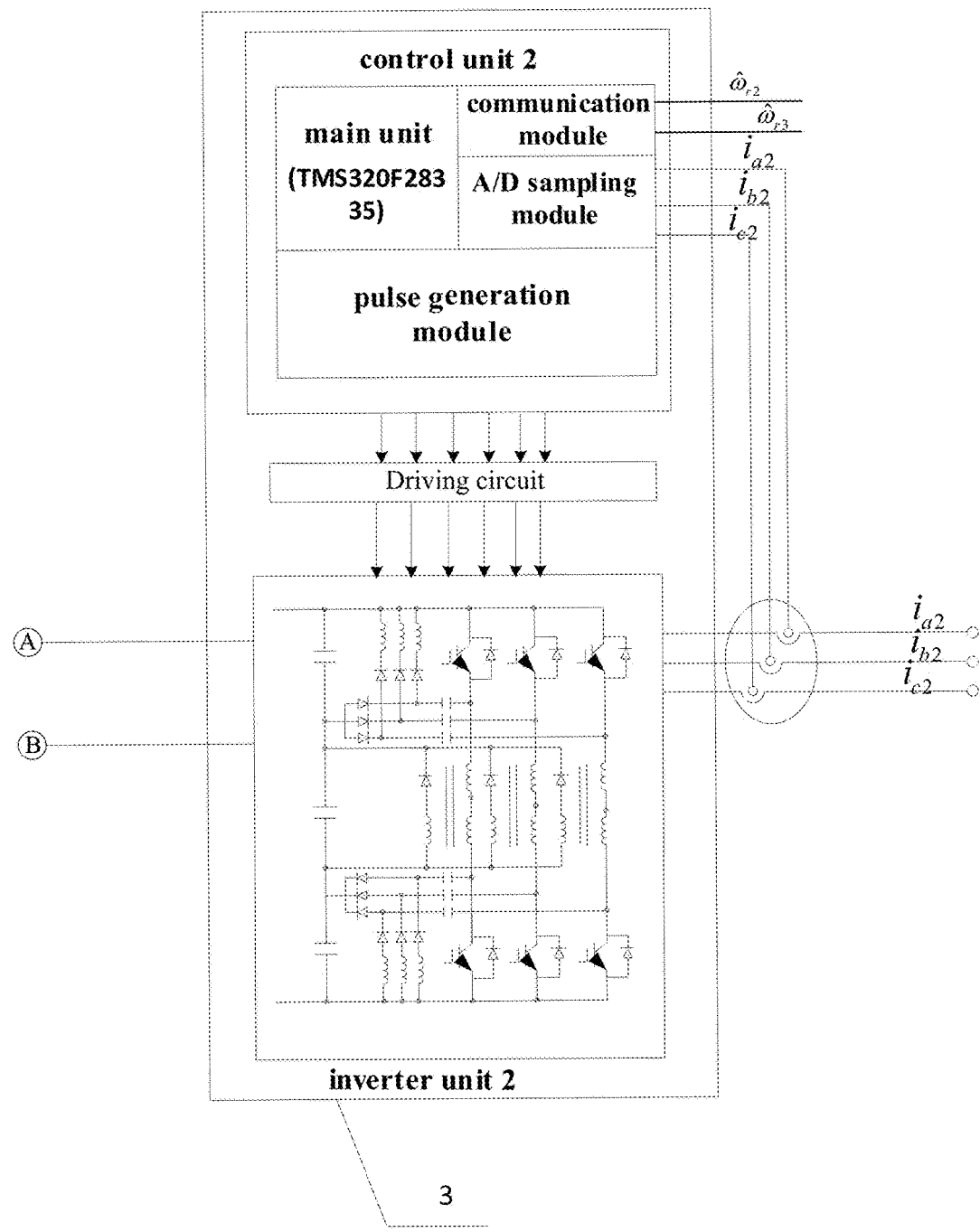
Figure 1:
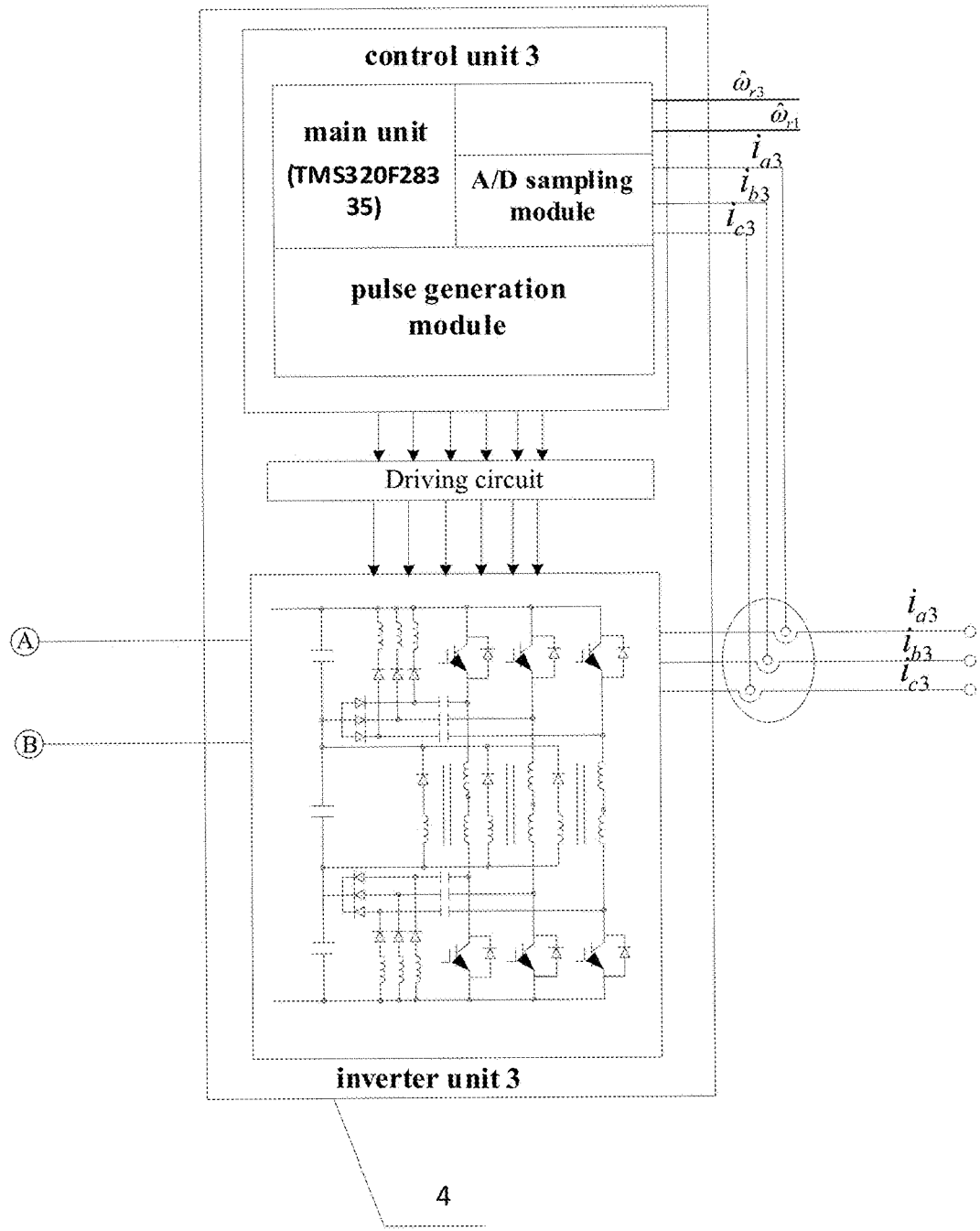
Figure 1:
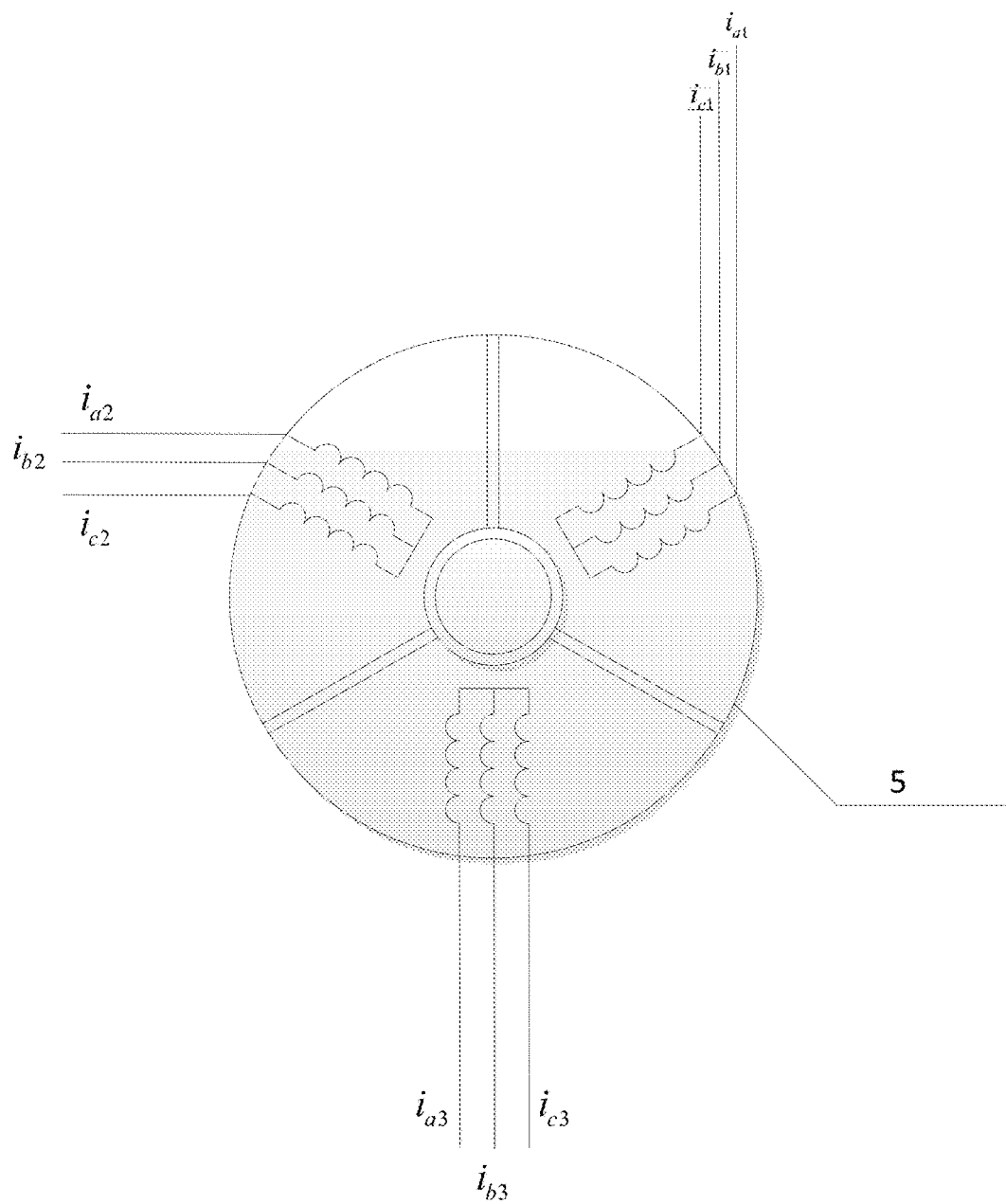
Figure 2:
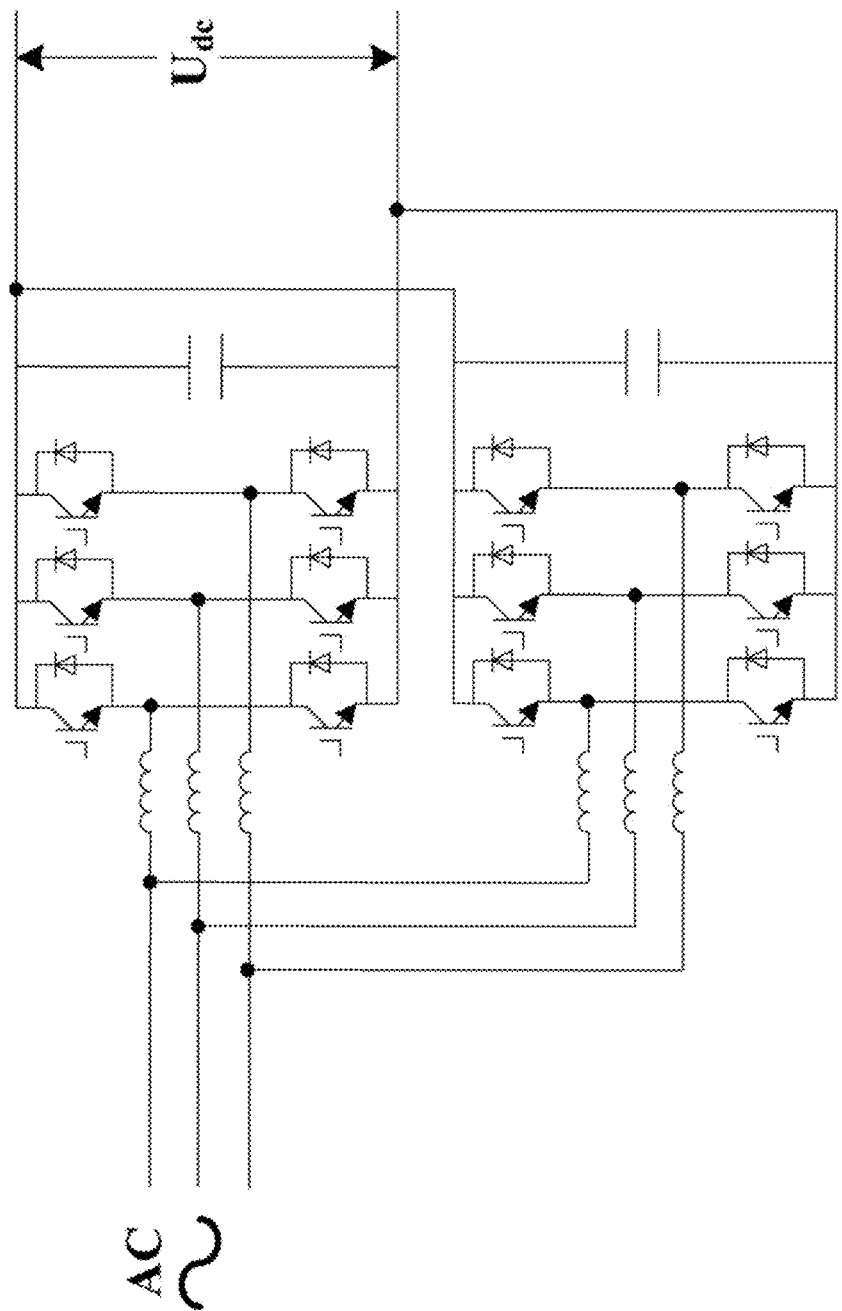
FIG. 2 is a schematic diagram of a double-parallel PWM rectifier circuit according to an embodiment of the present invention.
Figure 3:
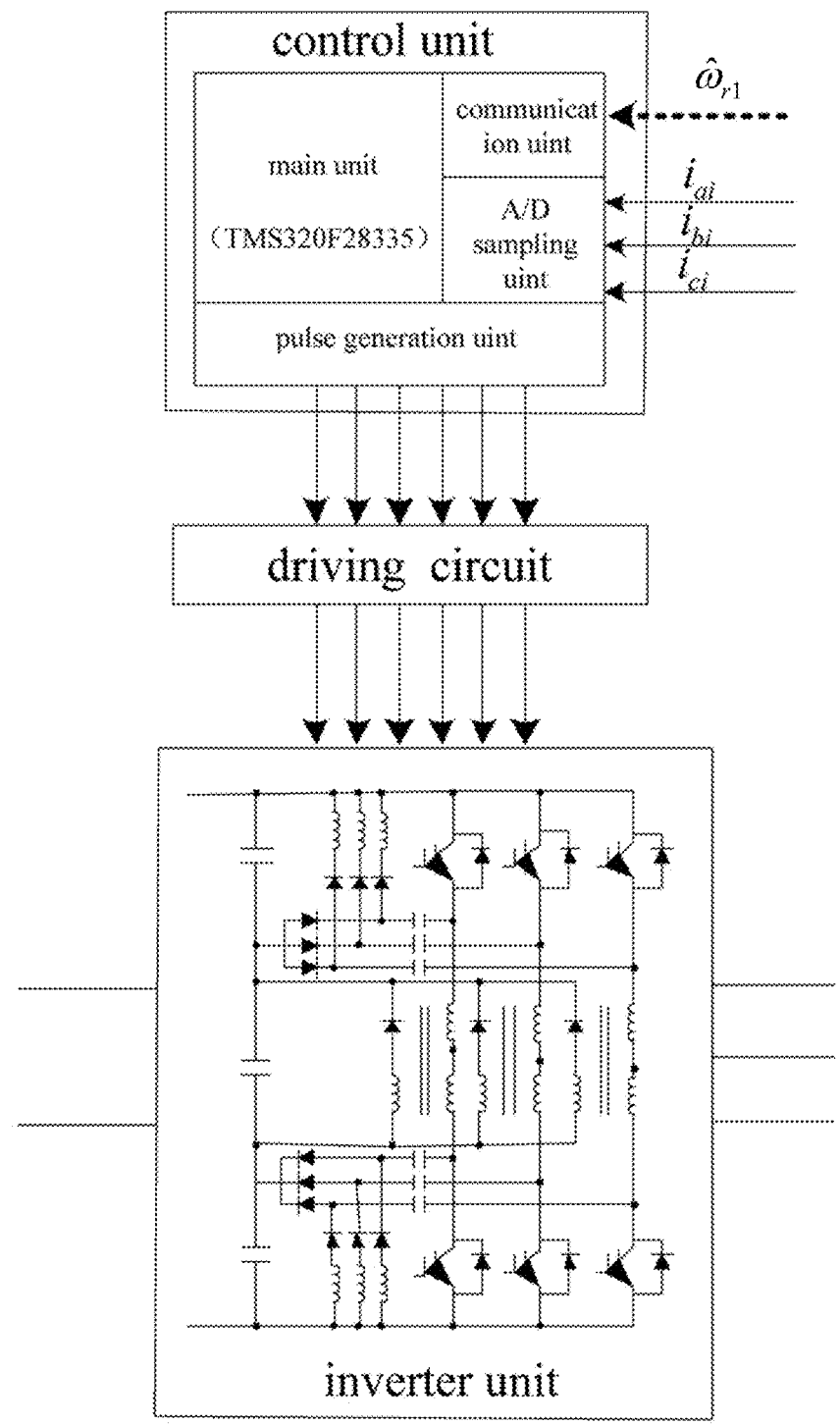
FIG. 3 is a block diagram of the internal structure of the first permanent magnet motor cooperative control unit, the second permanent magnet motor cooperative control unit and the third permanent magnet motor cooperative control unit according to an embodiment of the present invention.
Figure 4:
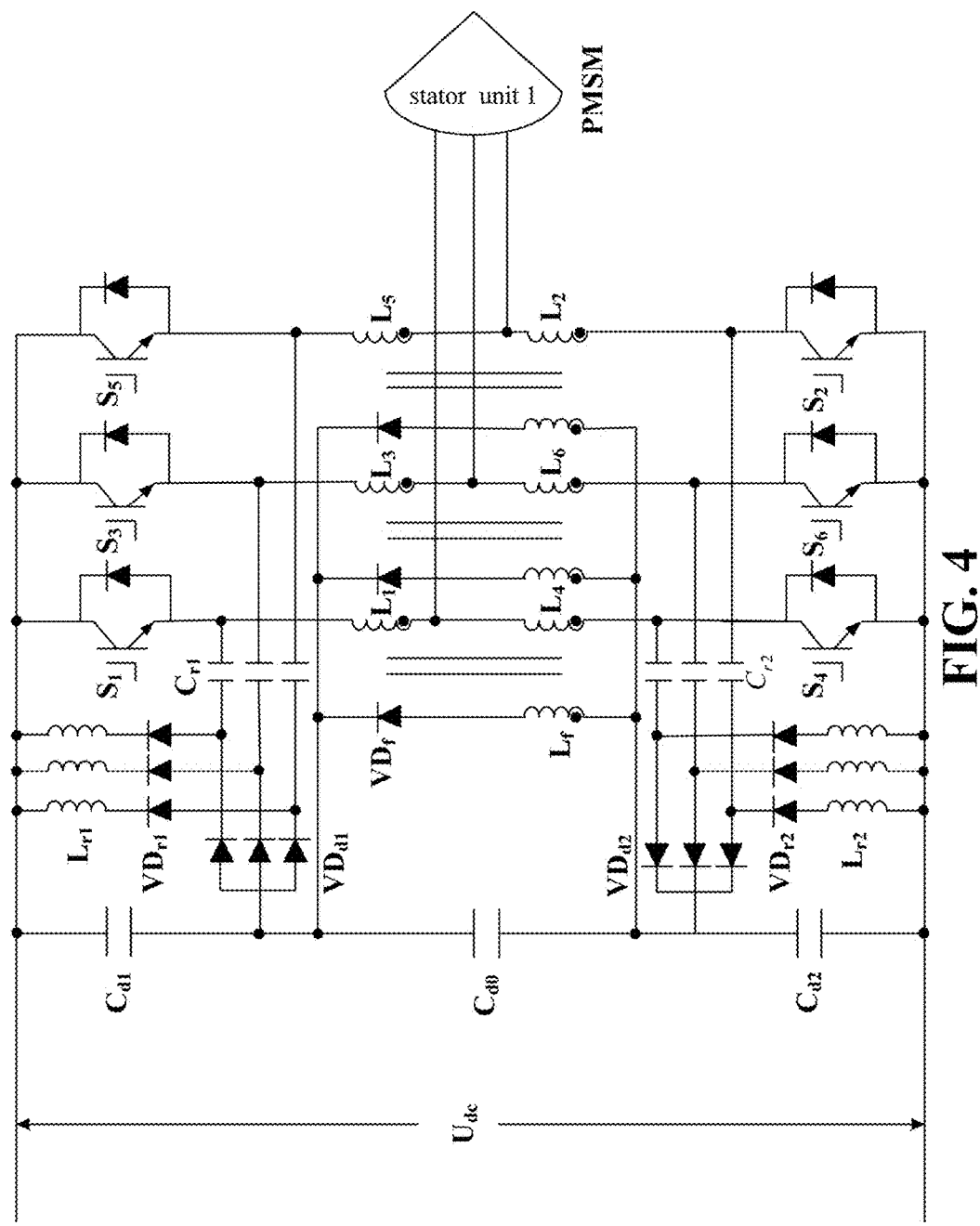
FIG. 4 is a resonant pole-type soft-switching inverter circuit diagram according to an embodiment of the present invention.
Figure 5:
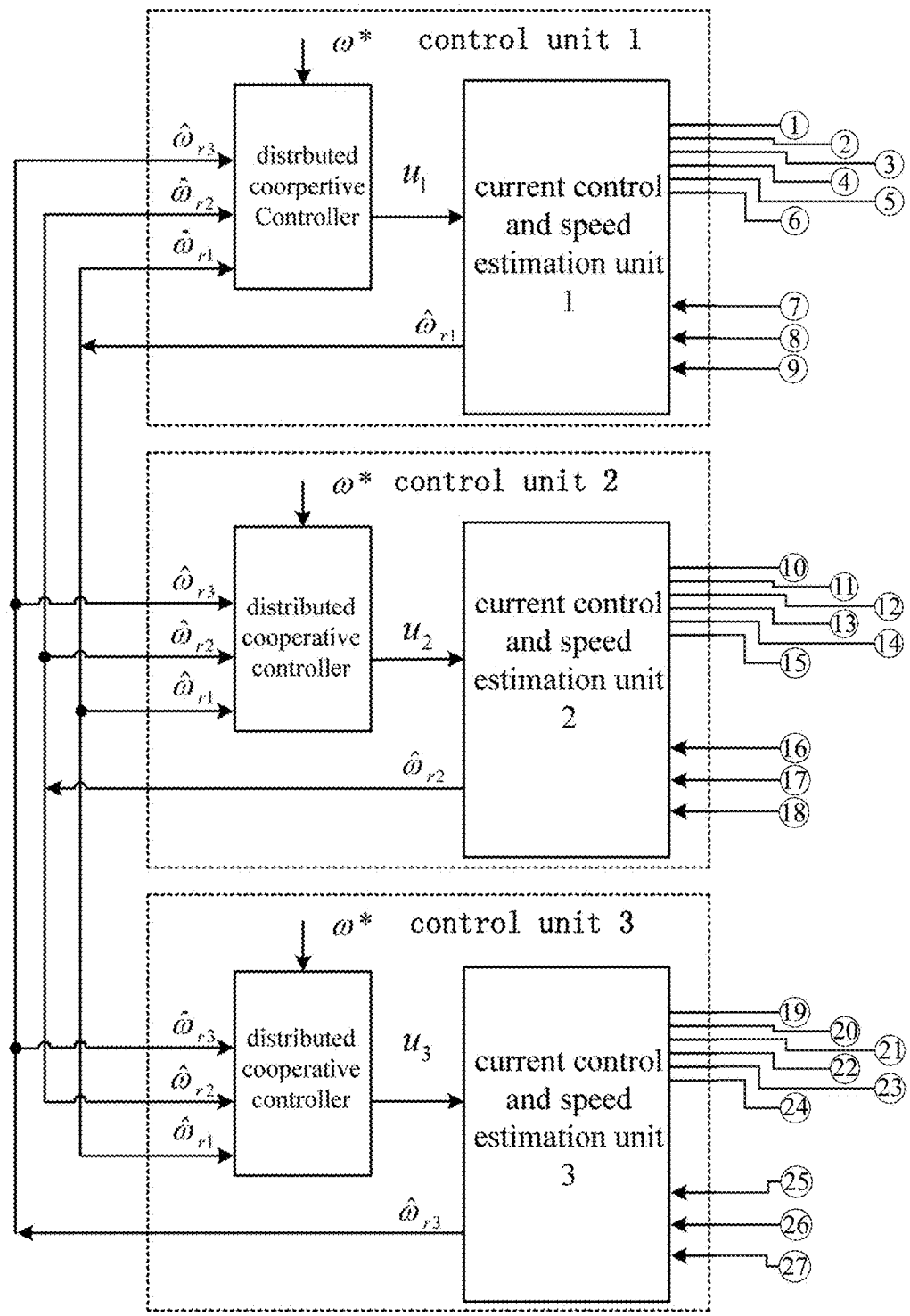
FIG. 5 is a schematic diagram of the internal structure of a control unit according to an embodiment of the present invention.
Figure 5:
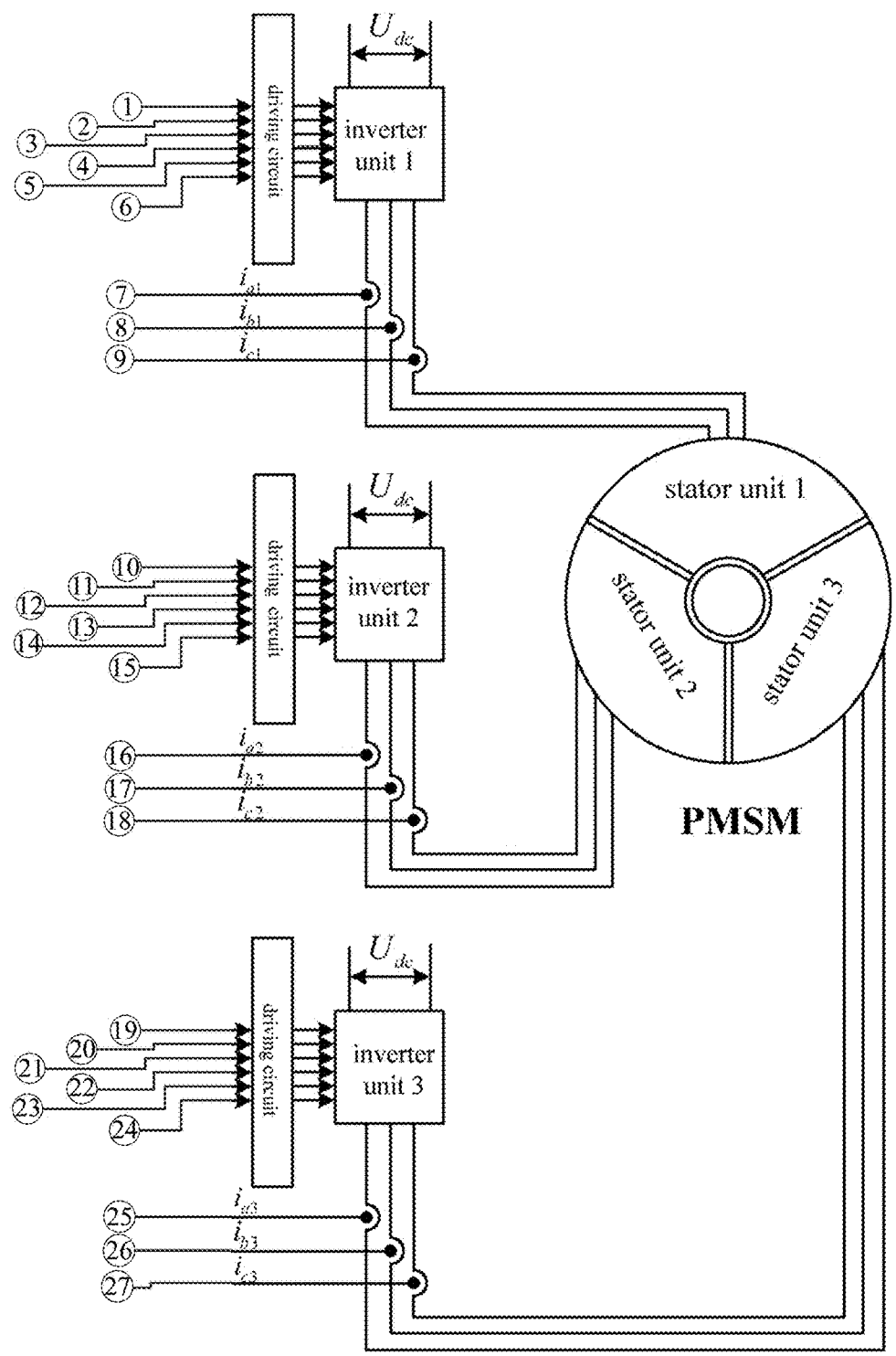

The intelligent cooperative control system for the multi-unit permanent magnet synchronous motor according to this embodiment of the present invention, as shown in FIG. 1, includes a double-parallel PWM rectifier circuit 1, a first permanent magnet motor cooperative control unit 2, a second permanent magnet motor cooperative control unit 3, a third permanent magnet motor cooperative control unit 4 and a multi-unit permanent magnet synchronous motor 5, wherein the first permanent magnet motor cooperative control unit 2, the second permanent magnet motor cooperative control unit 3 and the third permanent magnet motor cooperative control unit 4 cooperatively control three stator units of the multi-unit permanent magnet synchronous motor 5 through a parallel connection manner;

In this embodiment of the present invention, the double-parallel PWM rectifier circuit 1 is used to convert 380V alternating current power into direct current power with adjustable voltage; the circuit as shown in FIG. 2 adopts a structure of two groups of three-phase voltage source PWM rectifiers; with the neutral point of the AC power as a reference point, a corresponding relation between positive sequence current component and negative sequence current component and grid voltage as well as active power is established; through decoupling control of positive and negative sequence instantaneous active components and reactive components, and based on the influence of zero sequence circular current on low frequency components of voltage, the zero sequence circular current is compensated, so as to form an integral control scheme of the positive sequence current, voltage and power and the negative sequence current, voltage and power, and solve the problem that the parallel PWM rectifier structure is difficult to control in the unbalanced power supply network environment;

In this embodiment of the present invention, the first permanent magnet motor cooperative control unit, the second permanent magnet motor cooperative control unit and the third permanent magnet motor cooperative control unit adopt the same structure, as shown in FIG. 3, each of which includes a driving circuit, a control unit and an inverter unit, wherein the control units realize cooperative control of the multi-unit permanent magnet synchronous motor by mutual communications;

In this embodiment of the present invention, the control unit adopts DSP of TMS320F28335 type as the core, and is externally combined with a communication module, an A/D sampling module and a pulse generation module; the inverter unit adopts a resonant pole-type three-phase soft-switching inverter circuit (see patent with Application Number: 200910010240.9) as shown in FIG. 4, with three phase circuits all having separate resonant inductors, and this design can improve the utilization of DC bus voltage, reduce the device switching loss and reduce production costs;

In this embodiment of the present invention, as shown in FIG. 5, the control unit includes a distributed cooperative controller and a current control and speed estimation unit, wherein the current control and speed estimation unit is used for acquiring A phase, B phase and C phase current detection signals at an input end of the motor, obtaining rotor speed estimation values according to the acquired A Phase, B phase, and C phase current detection signals and simultaneously sending the rotor speed estimation values to the distributed cooperative controller of each control unit, and is also used for receiving output values of the distributed cooperative controllers, obtaining a direct-axis voltage reference value and a quadrature-axis voltage reference value in a two-phase stationary reference frame according to the output values, then obtaining PWM signals by using space vector pulse-width modulation, and sending the obtained PWM signals to the inverter unit through the driving circuits; and the distributed cooperative controller is used for describing a communication structure of the three control units by using a method for constructing an undirected graph, obtaining an overall communication association matrix of each of the control units according to the constructed undirected graph, constructing an error function according to the rotor speed estimation value, a set rotor speed reference value and the overall communication association matrix of the control units, setting a real number matrix and real number items, and obtaining an output value of each of the distributed cooperative controllers according to the constructed error function.

Figure 6:
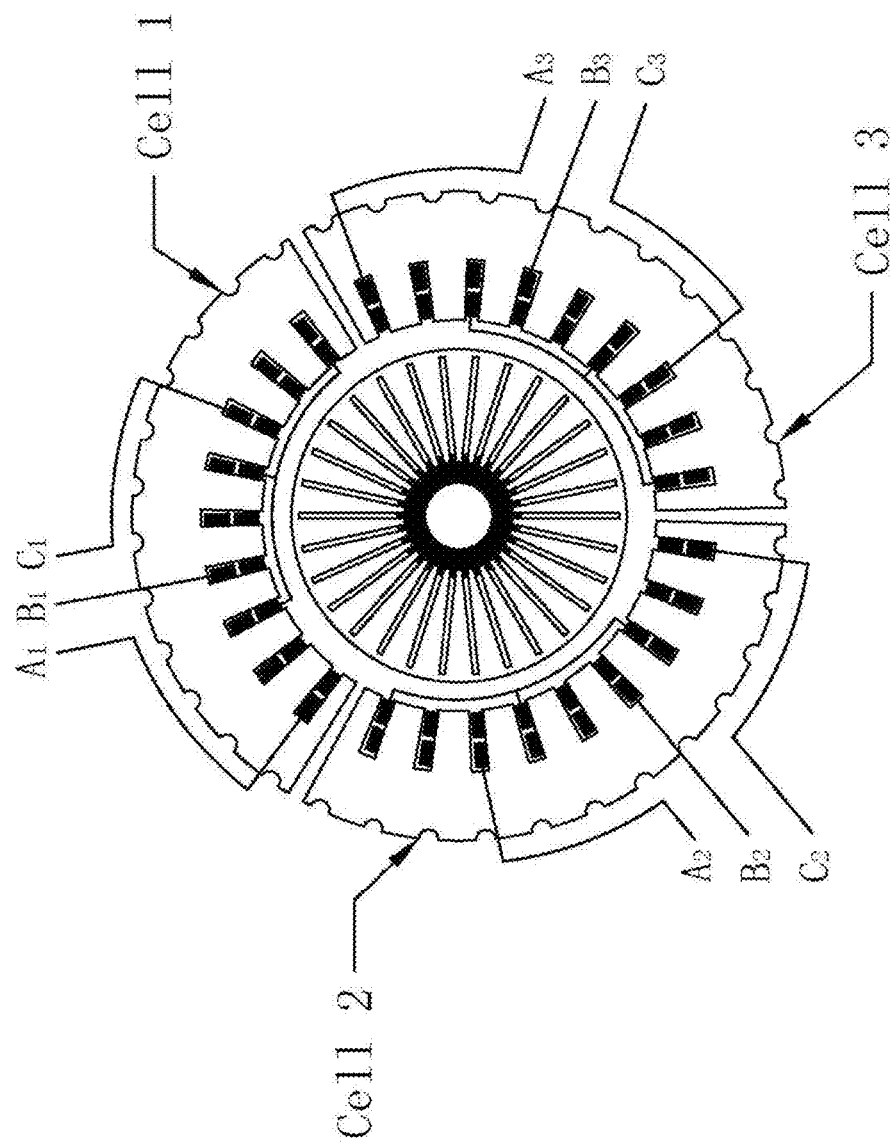
FIG. 6 is a schematic diagram of a multi-unit permanent magnet synchronous motor according to an embodiment of the present invention.

In this embodiment of the present invention, a multi-unit permanent magnet synchronous motor adopting a structure of a double fractional slot concentrated winding with a pitch of 1 is adopted, which greatly increases the slot full rate of the motor, and thus is more suitable for mechanical automatic winding in industrial production; also, because of a larger number of rotor pole pairs, a built-in tangential form is used in the rotor magnetic circuit, which all provide possibility for implementation of a multi-pole less-slot permanent magnet synchronous motor. A schematic diagram of the structure of a 27-slot 30-pole three-phase permanent magnet synchronous motor adopted as the multi-unit permanent magnet synchronous motor is shown in FIG. 6 wherein Cell1 represents a stator unit 1, Cell2 represents a stator unit 2, and Cell3 represents a stator unit 3; This embodiment of the present invention is split into multi-module permanent magnet motors by the following descriptions;

| 1 | 0 | 0 | 1 | 0 | 0 | 1 | 0 | 0 | 0 | 1 | 0 | 0 | 1 | 0 | 0 | 1 | 0 | 0 | 0 | 1 | 0 | 0 | 1 | 0 | 0 | 1 | 0 | 0 |
|---|---|---|---|---|---|---|---|---|---|---|---|---|---|---|---|---|---|---|---|---|---|---|---|---|---|---|---|---|
| A | c | | B | a | | C | b | | A | c | | B | a | | C | b | | A | c | | B | a | | C | b | | A | c |

Figure 7:
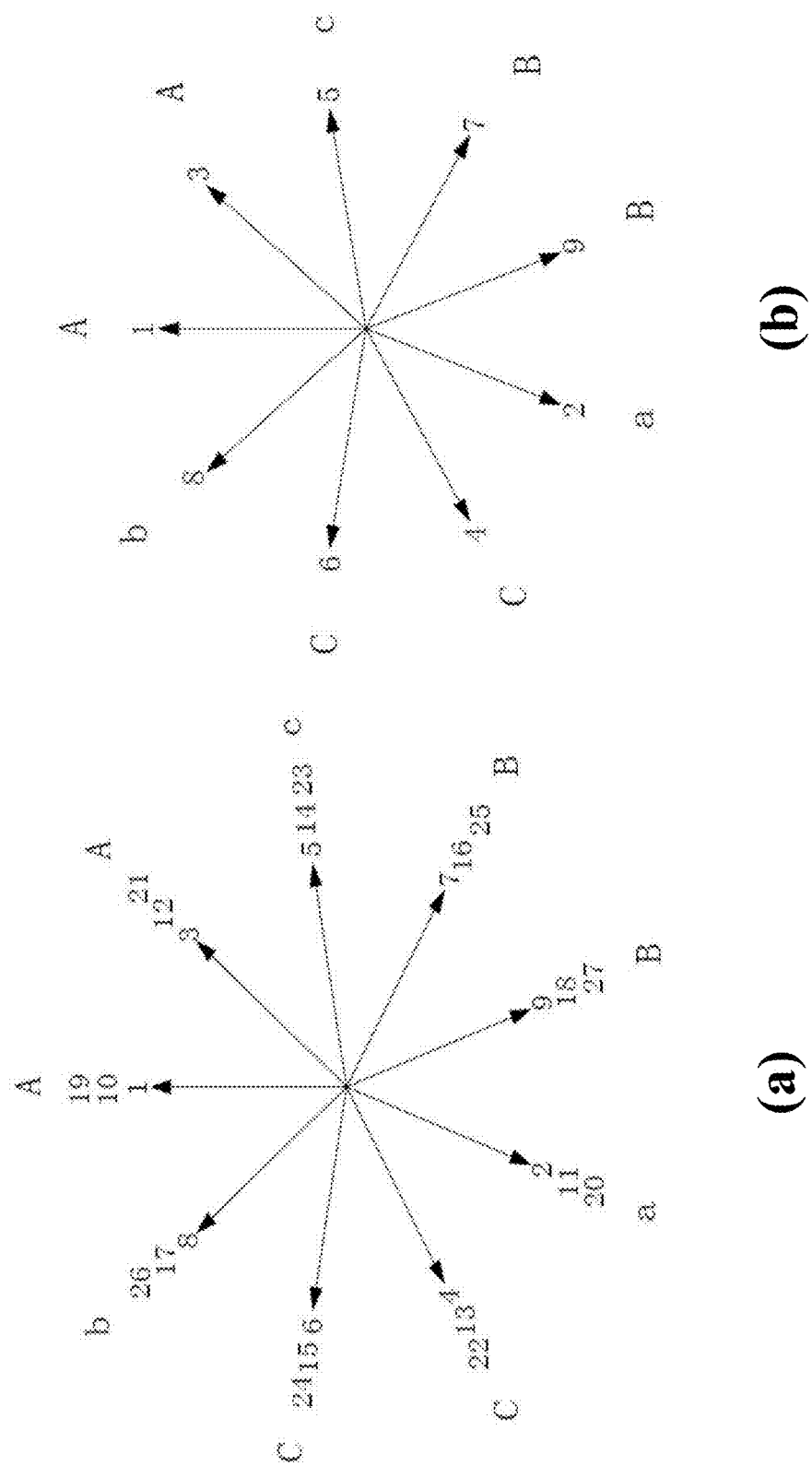
FIG. 7 is slot potential star graphs of a 27-slot 30-pole whole permanent magnet motor and a 9-slot 10-pole unit permanent magnet motor according to an embodiment of the present invention, wherein (a) is a slot potential star graph of the 27-slot 30-pole whole permanent magnet motor, and (b) is a slot potential star graph of the 9-slot 10-pole unit permanent magnet motor.
Figure 8:
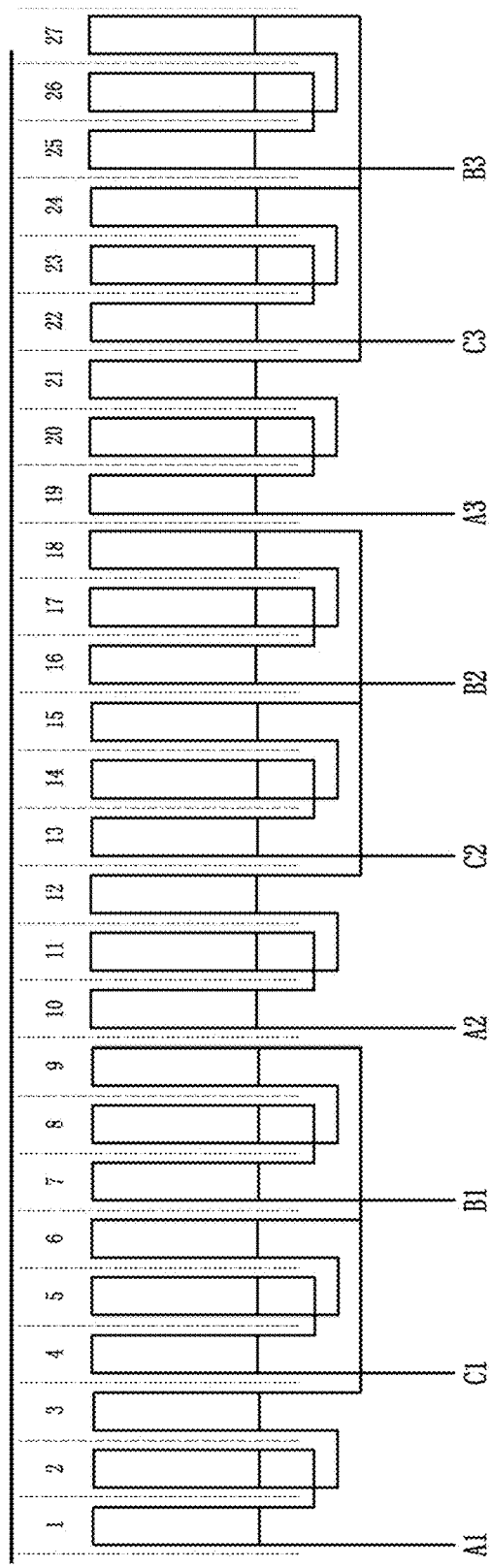
FIG. 8 is an extended graph of windings of a 27-slot 30-pole multi-unit permanent magnet synchronous motor according to an embodiment of the present invention.

I. calculating the number of split units and the number of unit motor slot poles of the whole motor;

wherein the number of stator slots of the whole motor is Z=27, the number of rotor pole pairs is p=15, and the maximum common divisor of the former two is t=3; the maximum common divisor of the number of stator slots and the number of rotor pole pairs of the whole motor number is the number of unit motors that can be obtained by splitting; thus, the whole motor consists of three identical unit motors, and all the units use the same rotor, while each unit motor internally still uses the star connection manner;

the number of slots and the number of pole pairs of each unit motor are respectively $Z_0=Z/t=9$ and $p_0=p/t=5$, so that it is concluded that the 27-slot 30-pole three-phase permanent magnet synchronous motor can be split into 3 units, each of which is a 9-slot 10-pole three-phase permanent magnet synchronous motor;

II. determining the slot potential star graphs of the whole motor and the unit motors;

calculating slot-pitch angles α and the number q of slots per pole per phase, respectively being:

$$\alpha = \frac{180° \times 2p_0}{Z_0} = 200°,$$

$$q = \frac{Z_0}{2mp_0} = \frac{3}{10} = \frac{b}{c};$$

wherein m is the number of motor stator winding phases, while b and c are respectively the numerator and denominator of q;

then obtaining the best arrangement manner of fractional slot concentrated winding as follows:

(1) firstly, calculating values of iq (i=1, 2, . . . ) sequentially according to the number per pole per phase q, until obtaining an integer, respectively being 3/10, 3/5, 9/10, 6/5, 3/2, 9/5, 21/10, 12/5, 27/10 and 3;

(2) finding the optimal cyclic number sequence;

taking the value of 0 as the first number, ranging the integer part (plus 1) of all the determined fractions in order behind 0, and taking the last integer that is taken as an integer, i.e., 0,1,1,1,2,2,2,3,3,3,3; then subtracting the previous term from the latter item in the resulting number sequence, wherein the new resulting number sequence is the optimal cyclic number sequence, which is 1,0,0,1,0,0,1,0,0,0;

(3) repeating the optimal cyclic number sequence several times, in the manner of dividing usually based on a 60° phase belt, and repeatedly assigning the windings AcBaCb to the optimal cyclic number sequence, until cycle is to the beginning state; and (4) taking out the windings below 1, and taking such winding sequence as the first layer of windings in fractional slot concentrated windings, arranged as: AaACcCBbB;

wherein, a, b and c represent coils embedded reversely; when double-layer windings are used, shifting the first layer of windings to the right by one slot so as to obtain the second layer of windings;

finally, enabling the slot potential star graphs of the 27-slot 30-pole whole permanent magnet motor and the 9-slot 10-pole unit permanent magnet motor to be shown in FIG. 7; and III. drawing out an expanded graph of windings of the unit motor;

wherein the clockwise direction is specified as the normal direction, uppercase letters represent the positive direction, and lower case letters represent the opposite direction, so that the expanded graph of the windings of the 27-slot 30-pole multi-unit permanent magnet synchronous motor is shown in FIG. 8.

Figure 9:
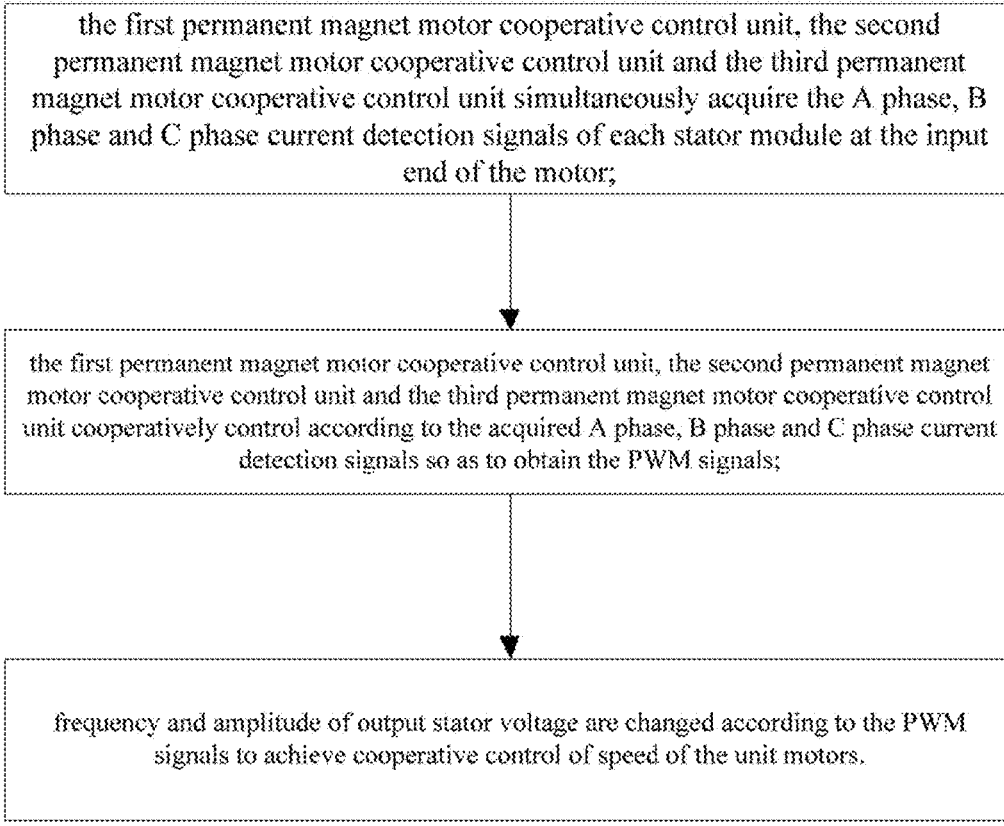
FIG. 9 is a flow diagram of the intellectual cooperative control method for the multi-unit permanent magnet synchronous motor according to an embodiment of the present invention.
Figure 10:
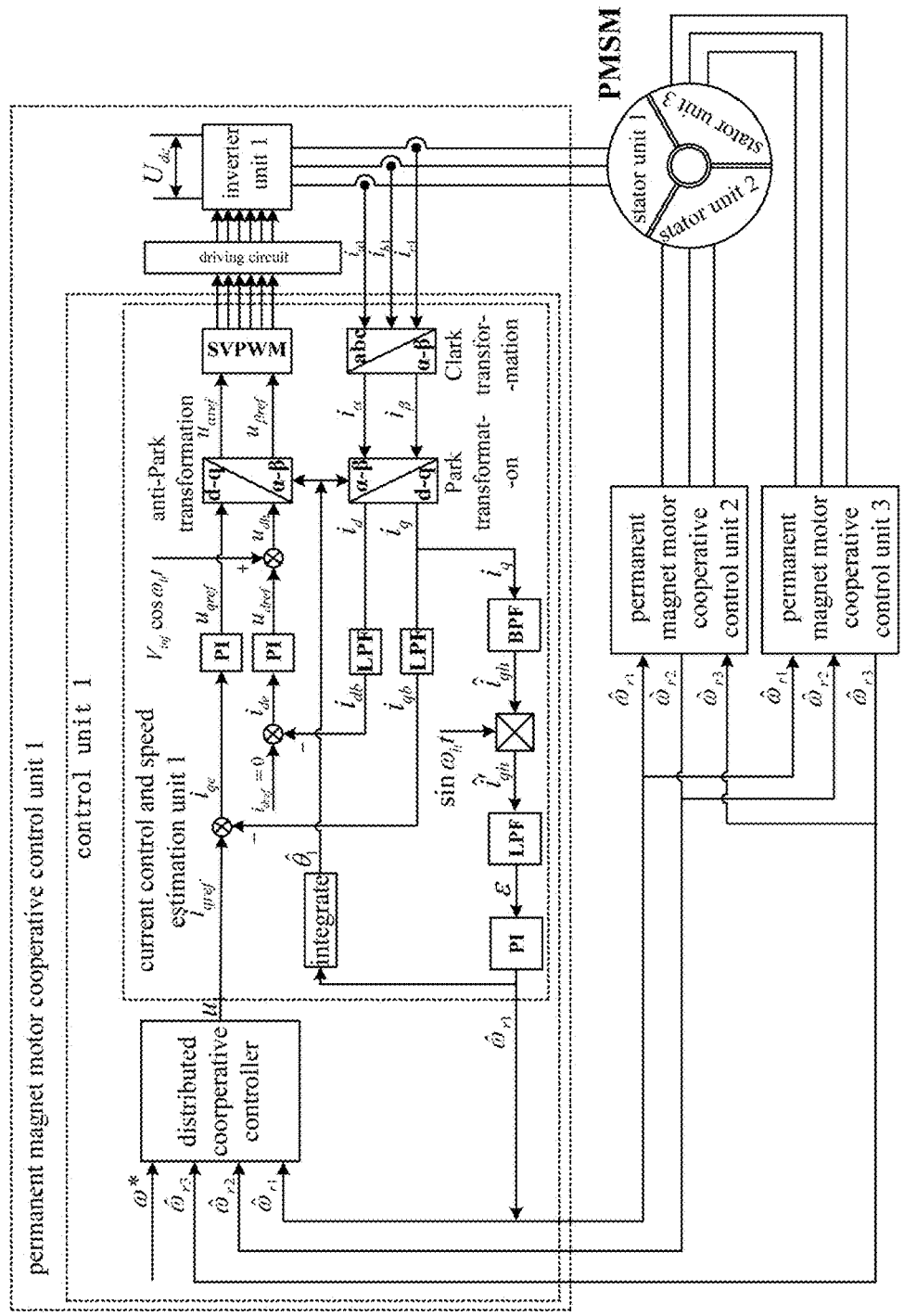
FIG. 10 is a block diagram of a sensorless control system for a multi-unit permanent magnet synchronous motor according to an embodiment of the present invention.
Figure 11:
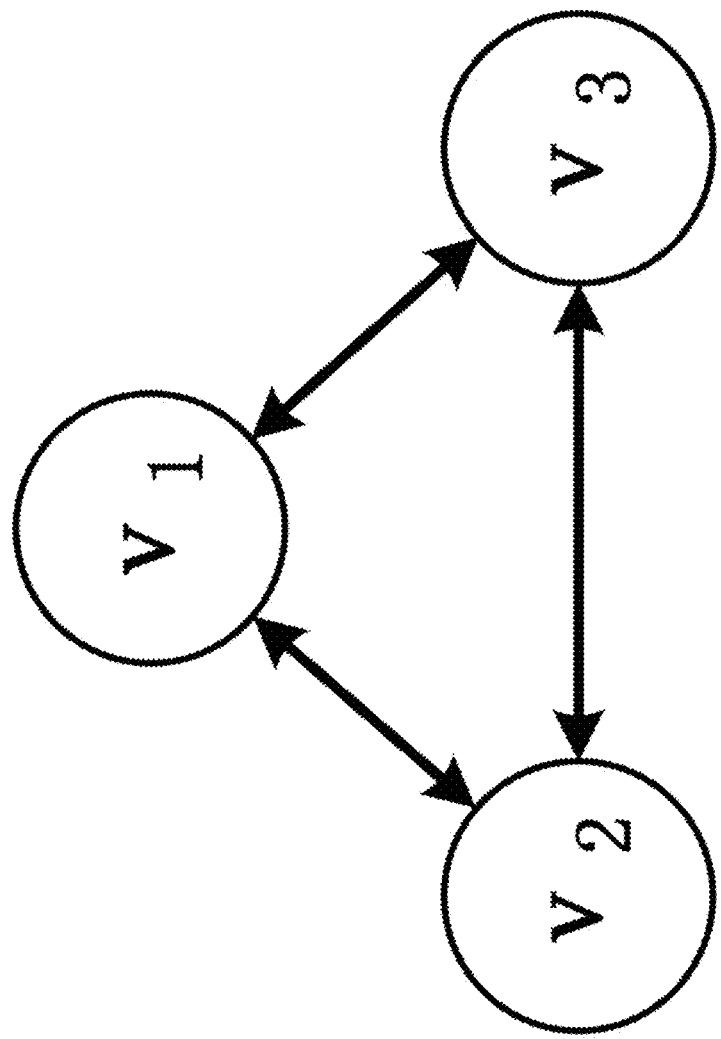
FIG. 11 is a constructed undirected graph according to an embodiment of the present invention.

In this embodiment of the present invention, the control method of using the intelligent cooperative control system for the multi-unit permanent magnet synchronous motor, with the flow diagram as shown in FIG. 9, includes the following steps:

step 1: the first permanent magnet motor cooperative control unit, the second permanent magnet motor cooperative control unit and the third permanent magnet motor cooperative control unit simultaneously acquire the A phase, B phase and C phase current detection signals at the input end of the motor;

in this embodiment of the present invention, three current sensors are adopted for acquiring the A phase, B phase and C phase current signals of the motor simultaneously, and sending the current signals to the first permanent magnet motor cooperative control unit, the second permanent magnet motor cooperative control unit and the third permanent magnet motor cooperative control unit;

step 2: the first permanent magnet motor cooperative control unit, the second permanent magnet motor cooperative control unit and the third permanent magnet motor cooperative control unit cooperatively control according to the acquired A phase, B phase and C phase current detection signals to obtain the PWM signals, including the following steps:

in this embodiment of the present invention, FIG. 10 is a block diagram of a sensorless control system for a multi-unit permanent magnet synchronous motor; in connection with FIG. 10, the specific steps of the cooperative control in step 2 are described by taking the internal control process of the first permanent magnet motor cooperative control unit as an example:

step 2-1: obtaining the rotor speed estimation value $\hat{\omega}_{r1}$ according to the A phase, B phase and C phase current detection signals $i_{a1}$, $i_{b1}$ and $i_{c1}$, and simultaneously sending the signals to each control unit (the first permanent magnet motor cooperative control unit, the second permanent magnet motor cooperative control unit and the third permanent magnet motor cooperative control unit) to achieve mutual communications among the three control units;

step 2-1-1: enabling the received current detection signals $i_{a1}$, $i_{b1}$ and $i_{c1}$ to be subjected to analog-to-digital conversion, and performing Clark transformation and Park transformation on the converted A phase, B phase and C phase current signals according to initial phase angle values of the rotor, to obtain direct-axis current $i_d$ and quadrature-axis current $i_q$ in the two-phase rotating reference frame d-q;

in this embodiment of the present invention, during initiation, the first permanent magnet motor cooperative control unit, the second permanent magnet motor cooperative control unit and the third permanent magnet motor cooperative control unit are used for obtaining stator winding resistance values and rotor initial phase angle values in each unit of the motor, setting the rotor speed reference value $\omega^*$ and introducing high-frequency voltage signal values $V_{inj} \cos \omega_h t$;

step 2-1-2: enabling the quadrature-axis current $i_q$ to be subjected to band-pass filter to obtain a high frequency component $\hat{i}_{qh}$ of the quadrature-axis current, multiplying the high frequency component $\hat{i}_{qh}$ of the quadrature-axis current with a sinusoidal high-frequency signal $\sin \omega_h t$ to obtain a quadrature-axis current high frequency component $\hat{i}'_{qh}$ of a separable phase angle error signal, and enabling the quadrature-axis current high frequency component $\hat{i}'_{qh}$ to be subjected to low-pass filter to obtain a current signal $\varepsilon$ only containing phase angle errors;

the specific calculating equation is as follows:

$$\hat{i}_{qh} \approx \frac{2V_{inj}L_1 \sin\omega_h t}{\omega_h(L_1^2 - L_0^2)} \Delta\theta \quad (1)$$

$$\hat{i}'_{qh} = \frac{V_{inj}L_1 \Delta\theta}{\omega_h(L_1^2 - L_0^2)}(1 - \cos 2\omega_h t) \quad (2)$$

$$\varepsilon = \frac{V_{inj}L_1}{\omega_h(L_1^2 - L_0^2)} \Delta\theta = K\Delta\theta \quad (3)$$

wherein, $V_{inj}$ represents the amplitude of the injected high-frequency voltage signal, and $\omega_h$ represents the frequency of the injected high-frequency voltage signal; $L_0$ represents semi-differential inductance with a value the half of the difference between the q axis equivalent inductance and the d axis equivalent inductance; $L_1$ represents average inductance with a value the half of the sum of the q axis equivalent inductance and the d axis equivalent inductance; and $\Delta\theta$ represents the phase angle error signal;

step 2-1-3: obtaining the rotor speed estimation value $\hat{\omega}_{r1}$ by using a PI control algorithm, and obtaining a rotor phase angle estimation value by integral calculation on the rotor speed estimation value $\hat{\theta}_1$.

step 2-2: describing the communication structure of the three control units by using a method for constructing the undirected graph;

in this embodiment of the present invention, the first permanent magnet motor cooperative control unit, the second permanent magnet motor cooperative control unit and the third permanent magnet motor cooperative control unit all adopt a full duplex communication mode, so that the communication structure of the distributed controller is described by using the undirected graph; as shown in FIG. 11, the first permanent magnet motor cooperative control unit, the second permanent magnet motor cooperative control unit and the third permanent magnet motor cooperative control unit in the system are defined as three nodes $v_1$, $v_2$ and $v_3$ respectively;

step 2-3: obtaining the overall communication association matrix of the control units according to the constructed undirected graph, and constructing the error function according to the rotor speed estimation value, the rotor speed reference value set by users and the overall communication association matrix of the control units;

constructing the undirected graph $G=(V, \varepsilon, \Lambda)$, wherein, $V=\{v_1,v_2,v_3\}$ represents a set of the three nodes, $\varepsilon \subseteq V \times V$ represents a set of all edges as shown in the graph, $\Lambda=[a_{ij}]\varepsilon R^{3\times 3}$ is an adjacency matrix of the undirected graph (the overall communication association matrix of the control units), i, j=1, 2, 3, $a_{ij}$ is the 0 or 1 value, $\Lambda$ is the real number symmetric matrix of 3×3; when the $i_{th}$ node can receive information from the $j_{th}$ node, $a_{ij}=1$; else $a_{ij}=0$, each node does not constitute an information cycle itself, so $a_{ii}=0$;

the adjacency matrix of the system is:

$$\Lambda = \begin{bmatrix} 0 & a_{12} & a_{13} \\ a_{12} & 0 & a_{23} \\ a_{13} & a_{23} & 0 \end{bmatrix} \quad (4)$$

wherein, $\Lambda$ represents the communication association matrix between every two control units, namely an adjacency matrix of the undirected graph; $a_{ij}$ represents a communication relationship between the $i_{th}$ control unit and the $j_{th}$ control unit; when the $i_{th}$ control unit can receive information from the $j_{th}$ control unit, $a_{ij}=1$, else $a_{ij}=0$, i, j=1, 2, 3;

for the $i_{th}$ node, output vector $$\omega_i = \begin{bmatrix} \hat{\omega}_{ri} \\ \dot{\hat{\omega}}_{ri} \end{bmatrix}$$

is constructed, and the error can be written as:

$$e_i = \sum_{j=1}^{3} a_{ij}(\omega_i - \omega_j) + g_i(\omega_i - \omega_0) \quad (5)$$

in matrix $$\omega_i = \begin{bmatrix} \hat{\omega}_{ri} \\ \dot{\hat{\omega}}_{ri} \end{bmatrix},$$

$\hat{\omega}_{ri}$ represents the rotor speed estimation value obtained by the $i_{th}$ control unit, and $\dot{\hat{\omega}}_{ri}$ represents the derivative of the rotor speed estimation value obtained by the $i_{th}$ control unit; in matrix $$\omega_0 = \begin{bmatrix} \omega^* \\ \dot{\omega}^* \end{bmatrix},$$

ω* represents the rotor speed reference value, ω̇* represents the derivative of the rotor speed reference value, namely the acceleration, and the value of $g_i$ is 0 or 1; when the $i_{th}$ control unit can receive the control unit reference value ω*, $g_i=1$, else $g_i=0$.

Then the system error function is:

$$\begin{cases} e_1 = a_{12} \begin{bmatrix} \hat{\omega}_{r1} - \hat{\omega}_{r2} \\ \dot{\hat{\omega}}_{r1} - \dot{\hat{\omega}}_{r2} \end{bmatrix} + a_{13} \begin{bmatrix} \hat{\omega}_{r1} - \hat{\omega}_{r3} \\ \dot{\hat{\omega}}_{r1} - \dot{\hat{\omega}}_{r3} \end{bmatrix} + g_1 \begin{bmatrix} \hat{\omega}_{r1} - \omega^* \\ \dot{\hat{\omega}}_{r1} - \dot{\omega}^* \end{bmatrix} \\ e_2 = a_{12} \begin{bmatrix} \hat{\omega}_{r2} - \hat{\omega}_{r1} \\ \dot{\hat{\omega}}_{r2} - \dot{\hat{\omega}}_{r1} \end{bmatrix} + a_{23} \begin{bmatrix} \hat{\omega}_{r2} - \hat{\omega}_{r3} \\ \dot{\hat{\omega}}_{r2} - \dot{\hat{\omega}}_{r3} \end{bmatrix} + g_2 \begin{bmatrix} \hat{\omega}_{r2} - \omega^* \\ \dot{\hat{\omega}}_{r2} - \dot{\omega}^* \end{bmatrix} \\ e_3 = a_{13} \begin{bmatrix} \hat{\omega}_{r3} - \hat{\omega}_{r1} \\ \dot{\hat{\omega}}_{r3} - \dot{\hat{\omega}}_{r1} \end{bmatrix} + a_{23} \begin{bmatrix} \hat{\omega}_{r3} - \hat{\omega}_{r2} \\ \dot{\hat{\omega}}_{r3} - \dot{\hat{\omega}}_{r2} \end{bmatrix} + g_3 \begin{bmatrix} \hat{\omega}_{r3} - \omega^* \\ \dot{\hat{\omega}}_{r3} - \dot{\omega}^* \end{bmatrix} \end{cases} \quad (6)$$

step 2-4: setting the real number matrix and the real number items, and obtaining the output values according to the constructed error function;

$$u_i = \omega^* + cKe_i \quad (7)$$

wherein $u_i$ represents the output value of the distributed cooperative controller in the $i_{th}$ control unit, c is a real number, and K is a real number vector of 1×2; in the $$c \geq \frac{1}{\lambda_{min}(\Lambda_G)},$$

$\lambda_{min}(\Lambda_G)$ represents the real part of the minimum value of the eigenvalues of the matrix $\Lambda_G$, the matrix $\Lambda_G$ being:

$$\Lambda_G = \begin{bmatrix} g_1 + a_{12} + a_{13} & -a_{12} & -a_{13} \\ -a_{12} & g_2 + a_{12} + a_{23} & -a_{23} \\ -a_{13} & -a_{23} & g_3 + a_{13} + a_{23} \end{bmatrix} \quad (8)$$

The vector K is calculated according to the steps of:

(1) constructing a performance index function $J=\int(e_i^T N e_i + u_i^T R u_i)dt$ to obtain the optimal matrix N and the matrix R corresponding to the minimum performance index function; wherein, matrix N and matrix R are both 2×2 positive definite symmetric matrices, and matrix N and matrix R are both set as the unit matrix in the initiation;

(2) applying the resulting matrix N and the matrix R into the equation $D^T M + MD + N - MBR^{-1}B^T M = 0$ to find the matrix M. wherein the matrix $$D = \begin{bmatrix} 0 & 1 \\ 0 & 0 \end{bmatrix},$$

matrix $$B = \begin{bmatrix} 0 \\ 1 \end{bmatrix};$$

and (3) applying the resulting matrix M into the equation $K = R^{-1}B^T M$, to find the vector K.

step 2-5: obtaining the direct-axis voltage reference value and the quadrature-axis voltage reference value in the two-phase stationary reference frame according to the output values, and then obtaining PWM signals by using space vector pulse-width modulation, including the following steps:

step 2-5-1: taking the output value $u_i$ as a quadrature-axis current reference $i_{qref}$;

step 2-5-2: enabling the obtained direct-axis current $i_d$ and quadrature-axis current $i_q$ to be subjected to the low-pass filter to obtain fundamental direct-axis current $i_{db}$ and fundamental quadrature-axis current $i_{qb}$;

step 2-5-3: comparing the fundamental quadrature-axis current $i_{qb}$ with the quadrature-axis current reference $i_{qref}$ to obtain a quadrature-axis current error value $i_{qe}$, and comparing the fundamental direct-axis current $i_{db}$ and the direct-axis current reference $i_{dref}$ (taking 0), to obtain a direct-axis current error value $i_{de}$;

step 2-5-4: respectively calculating the quadrature-axis current error value $i_{qe}$ and the direct-axis current error value $i_{de}$ by using a PI control algorithm, to obtain a quadrature-axis voltage reference value $u_{qref}$ and a direct-axis voltage reference value $u_{dref}$, and summing up the direct-axis voltage reference value $u_{dref}$ with a high-frequency voltage signal value $V_{inj} \cos \omega_h t$ to obtain a direct-axis voltage reference value $u_{dh}$ containing the high-frequency signal; and step 2-5-5: performing anti-Park transformation on the quadrature-axis voltage reference value $u_{qref}$ and the direct-axis voltage reference value $u_{dh}$ containing the high-frequency signal according to the motor rotor phase angle estimation value $\hat{\theta}_1$, to obtain a direct-axis voltage reference value $u_{\beta ref}$ and a quadrature-axis voltage reference value $u_{\alpha ref}$ in the two-phase stationary reference frame, and then obtaining PWM signals by inputting $u_{\alpha ref}$ and $u_{\beta ref}$ into an SVPWM module; and step 3: frequency and amplitude of output stator voltage are changed according to the PWM signals to achieve cooperative control of speed of the unit motors;

In this embodiment of the present invention, the PWM signals control the inverter unit 1 to output a corresponding three-phase sinusoidal waveform through the driving circuit, thereby controlling the stator unit 1 of the motor.

Figure 12:
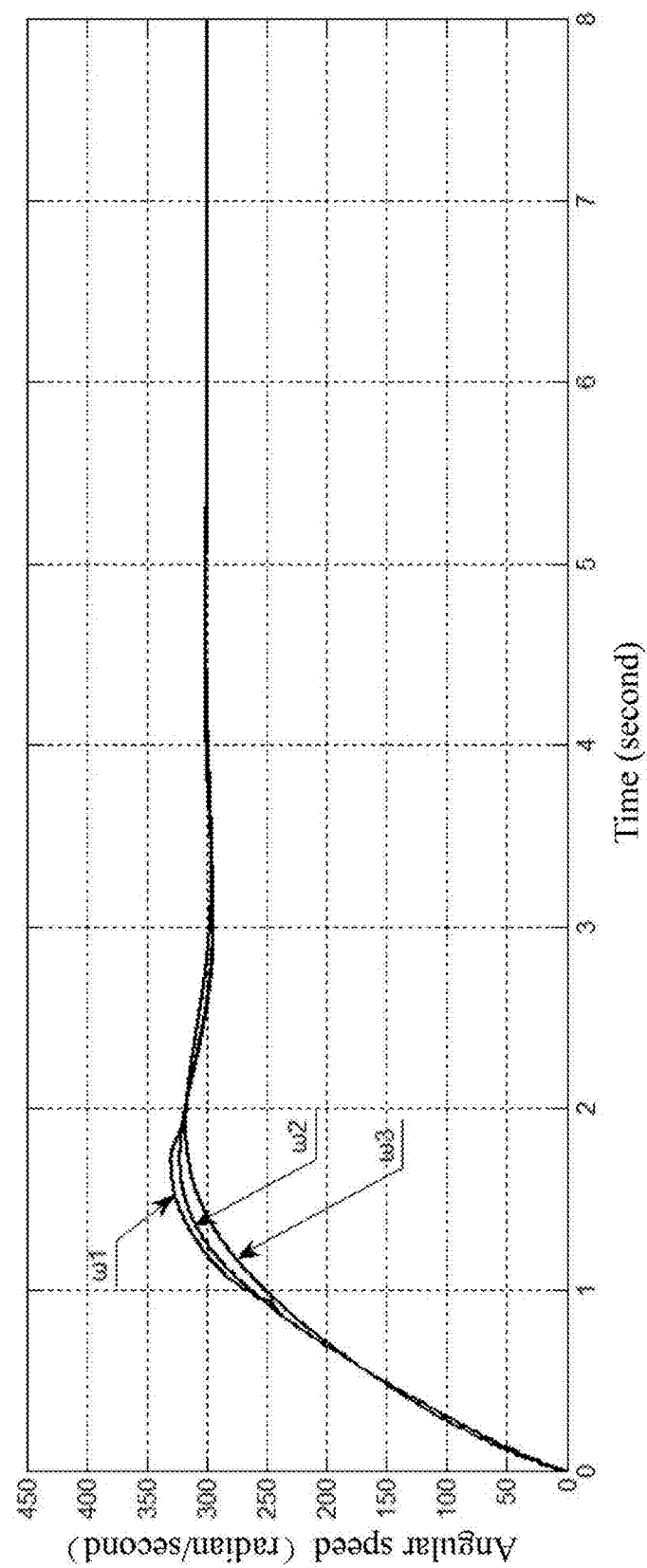
FIG. 12 is a curve graph of speed estimation values of cooperative control units according to an embodiment of the present invention.

In this embodiment of the present invention, as shown in FIG. 12, the rotor speed reference value ω*=300 rad/s set in the present embodiment is w1, w2 and w3 in the drawing respectively represent corresponding curves of the speed estimation values $\hat{\omega}_{r1}$, $\hat{\omega}_{r2}$ and $\hat{\omega}_{r3}$ of the three units input to the distributed cooperative controller. It can be seen from the drawing that, the speed estimation values of the three units at the beginning are zero, and under the effect of distributed cooperative controller, after 4 s the speed estimation values of the three units tend to be consistent. The units enable the three stator units to produce a rotating magnetic field with synchronous speed through the separate distributed cooperative controllers without using speed sensors, thereby achieving the integral cooperative control of the speed of the motor.

What is claimed is:

1. An intelligent cooperative control system for a multi-unit permanent magnet synchronous motor, comprising a double-parallel PWM rectifier circuit, a first permanent magnet motor cooperative control unit, a second permanent magnet motor cooperative control unit, a third permanent magnet motor cooperative control unit and a multi-unit permanent magnet synchronous motor, wherein the first permanent magnet motor cooperative control unit, the second permanent magnet motor cooperative control unit and the third permanent magnet motor cooperative control unit cooperatively control three stator units of the multi-unit permanent magnet synchronous motor in a parallel connection manner, the first permanent magnet motor cooperative control unit, the second permanent magnet motor cooperative control unit and the third permanent magnet motor cooperative control unit adopt the same structure, each of which comprises a driving circuit, a control unit and an inverter unit, wherein the control units realize cooperative control of the multi-unit permanent magnet synchronous motor by mutual communications, each of the control units comprises a distributed cooperative controller and a current control and speed estimation unit, wherein the current control and speed estimation unit is used for acquiring A phase, B phase and C phase current detection signals at an input end of the motor, obtaining rotor speed estimation values according to the acquired A Phase, B phase, and C phase current detection signals and simultaneously sending the rotor speed estimation values to the distributed cooperative controller of each control unit, and is also used for receiving output values of the distributed cooperative controllers, obtaining a direct-axis voltage reference value and a quadrature-axis voltage reference value in a two-phase stationary reference frame according to the output values, then obtaining PWM signals by using space vector pulse-width modulation, and sending the obtained PWM signals to the inverter unit through the driving circuits, the distributed cooperative controller is used for describing a communication structure of the three control units by using a method for constructing an undirected graph, obtaining an overall communication association matrix of each of the control units according to the constructed undirected graph, constructing an error function according to the rotor speed estimation value, a set rotor speed reference value and the overall communication association matrix of the control units, setting a real number matrix and real number items, and obtaining an output value of each of the distributed cooperative controllers according to the constructed error function.

2. The intelligent cooperative control system for the multi-unit permanent magnet synchronous motor according to claim 1, wherein in the multi-unit permanent magnet synchronous motor, a stator is in a 27-slot 30-pole split structure, each unit is in a 9-slot 10-pole structure, and all stator units share a rotor; the rotor is in a permanent magnetic built-in tangential structure; a double fractional slot concentrated winding with a pitch of 1 is adopted for a winding of each unit motor, and internal windings of the unit motors are in a star connection manner.

3. A control method using the intelligent cooperative control system for the multi-unit permanent magnet synchronous motor according to claim 1, comprising the following steps:

step 1: a first permanent magnet motor cooperative control unit, a second permanent magnet motor cooperative control unit and a third permanent magnet motor cooperative control unit simultaneously acquire the A phase, B phase and C phase current detection signals of each stator module at the input end of the motor;

step 2: the first permanent magnet motor cooperative control unit, the second permanent magnet motor cooperative control unit and the third permanent magnet motor cooperative control unit cooperatively control according to the acquired A phase, B phase and C phase current detection signals to obtain the PWM signals, wherein the cooperative control comprises the following steps:

step 2-1: obtaining the rotor speed estimation value according to the A phase, B phase and C phase current detection signals, and simultaneously sending the signals to each control unit to achieve mutual communications among the three control units;

step 2-2: describing the communication structure of the three control units by using a method for constructing the undirected graph;

step 2-3: obtaining the overall communication association matrix of the control units according to the constructed undirected graph, and constructing the error function according to the rotor speed estimation value, the rotor speed reference value set by users and the overall communication association matrix of the control units;

step 2-4: setting the real number matrix and the real number items, and obtaining the output values according to the constructed error function;

step 2-5: obtaining the direct-axis voltage reference value and the quadrature-axis voltage reference value in the two-phase stationary reference frame according to the output values, and then obtaining PWM signals by using space vector pulse-width modulation step 3: changing frequency and amplitude of output stator voltage according to the PWM signals to achieve cooperative control of speed of the unit motors.

4. The control method according to claim 3, wherein the step 2-1 of obtaining the rotor speed estimation value according to the A phase, B phase and C phase current detection signals comprises the following steps:

step 2-1-1: enabling the received current detection signals to be subjected to analog-to-digital conversion, and performing Clark transformation and Park transformation on the converted A phase, B phase and C phase current signals according to initial phase angle values of the rotor, to obtain direct-axis current and quadrature-axis current in the two-phase rotating reference frame;

step 2-1-2: enabling the quadrature-axis current to be subjected to band-pass filter to obtain a high frequency component of the quadrature-axis current, multiplying the high frequency component of the quadrature-axis current with a sinusoidal high-frequency signal to obtain a quadrature-axis current high frequency component of a separable phase angle error signal, and enabling the quadrature-axis current high frequency component to be subjected to low-pass filter to obtain a current signal only containing phase angle errors;

step 2-1-3: obtaining the rotor speed estimation value by using a PI control algorithm, and obtaining a rotor phase angle estimation value by integral calculation on the rotor speed estimation value.

5. The control method according to claim 3, wherein the communication association matrix of the step 2-3 is a symmetric matrix in which the number of rows and the number of columns are both 3, and elements in the matrix are 0 or 1: when the control units can communicate with each other, the element value is 1, else the element valve is 0; the error function is: a result of multiplying differences between the rotor speed estimation value of one control unit and those of the other control units with a coefficient, and summing up the result and a new result of multiplying differences between the rotor speed estimation value of the control unit and the set rotor speed reference value with a coefficient, wherein for the result of multiplying differences between the rotor speed estimation value of one control unit and those of the other control units with the coefficient, the coefficient is an element in the communication association matrix.

6. The control method according to claim 3, wherein, the output value of the step 2-4 is calculated as follows: the error function is multiplied by the real number matrix and the real number items, and then summed with the set rotor speed reference value, wherein the real matrix is a 1×2 real number vector.

7. The control method according to claim 3, wherein the step 2-5 of obtaining the direct-axis voltage reference value and the quadrature-axis voltage reference value in the two-phase stationary reference frame according to the output value, comprises the following steps:

step 2-5-1: taking the output values as a quadrature-axis current reference;

step 2-5-2: enabling the obtained direct-axis current and quadrature-axis current to be subjected to the low-pass filter to obtain fundamental direct-axis current and fundamental quadrature-axis current;

step 2-5-3: comparing the fundamental quadrature-axis current with the quadrature-axis current reference, to obtain a quadrature-axis current error value, and comparing the fundamental direct-axis current and the direct-axis current reference, to obtain a direct-axis current error value;

step 2-5-4: respectively calculating the quadrature-axis current error value and the direct-axis current error value by using a PI control algorithm, to obtain a quadrature-axis voltage reference value and a direct-axis voltage reference value, and summing up the direct-axis voltage reference value with a high-frequency voltage signal value to obtain a direct-axis voltage reference value containing the high-frequency signal;

step 2-5-5: performing anti-Park transformation on the quadrature-axis voltage reference value and the direct-axis voltage reference value containing the high-frequency signal according to the motor rotor phase angle estimation value, to obtain a direct-axis voltage reference value and a quadrature-axis voltage reference value in the two-phase stationary reference frame, and then obtaining the PWM signals by using the space vector pulse-width modulation.

* * * * *